United States Patent
Choi

(10) Patent No.: US 7,108,178 B1
(45) Date of Patent: Sep. 19, 2006

(54) METHOD OF STOPPING A STOLEN CAR WITHOUT A HIGH-SPEED CHASE, UTILIZING A BAR CODE

(76) Inventor: Young Ill Choi, 305 E. Valencia Ave., Burbank, CA (US) 91502

( * ) Notice: Subject to any disclaimer, the term of this patent is extended or adjusted under 35 U.S.C. 154(b) by 724 days.

(21) Appl. No.: 10/678,913

(22) Filed: Oct. 6, 2003

(51) Int. Cl.
*G07B 15/02* (2006.01)
*H01H 47/22* (2006.01)

(52) U.S. Cl. .............. 235/384; 307/10.2; 702/159; 701/1

(58) Field of Classification Search ............. 235/375, 235/384; 307/10.2; 702/159; 701/1
See application file for complete search history.

(56) References Cited

U.S. PATENT DOCUMENTS

| | | | |
|---|---|---|---|
| 4,958,064 A * | 9/1990 | Kirkpatrick | 235/384 |
| 5,568,406 A * | 10/1996 | Gerber | 702/159 |
| 6,072,248 A * | 6/2000 | Muise et al. | 307/10.2 |
| 2003/0128104 A1* | 7/2003 | Lessard et al. | 340/426.11 |
| 2004/0049324 A1* | 3/2004 | Walker | 701/1 |

* cited by examiner

*Primary Examiner*—Karl D. Frech
*Assistant Examiner*—Daniel A. Hess
(74) *Attorney, Agent, or Firm*—Eugene Oak

(57) ABSTRACT

A safe method of stopping a stolen car without chasing at high speeds, utilizing a bar code implanted between the inner layer and outer layer of a rear safety glass is comprised of steps: 1) scan the barcode, 2) compare the read in barcode with those of the stolen cars stored in the police computer net, 3) trigger one of the three stopping means of this invention. Those three stopping means are: 1) turn off the engine, 2) puncture the rear tires with bullets, and 3) puncture the rear tires by mechanical means.

3 Claims, 7 Drawing Sheets

METHOD OF STOPPING A STOLEN CAR WITHOUT A HIGH-SPEED CHASE, UTILIZING A BAR CODE

FIELD OF THE INVENTION

Figure 1:
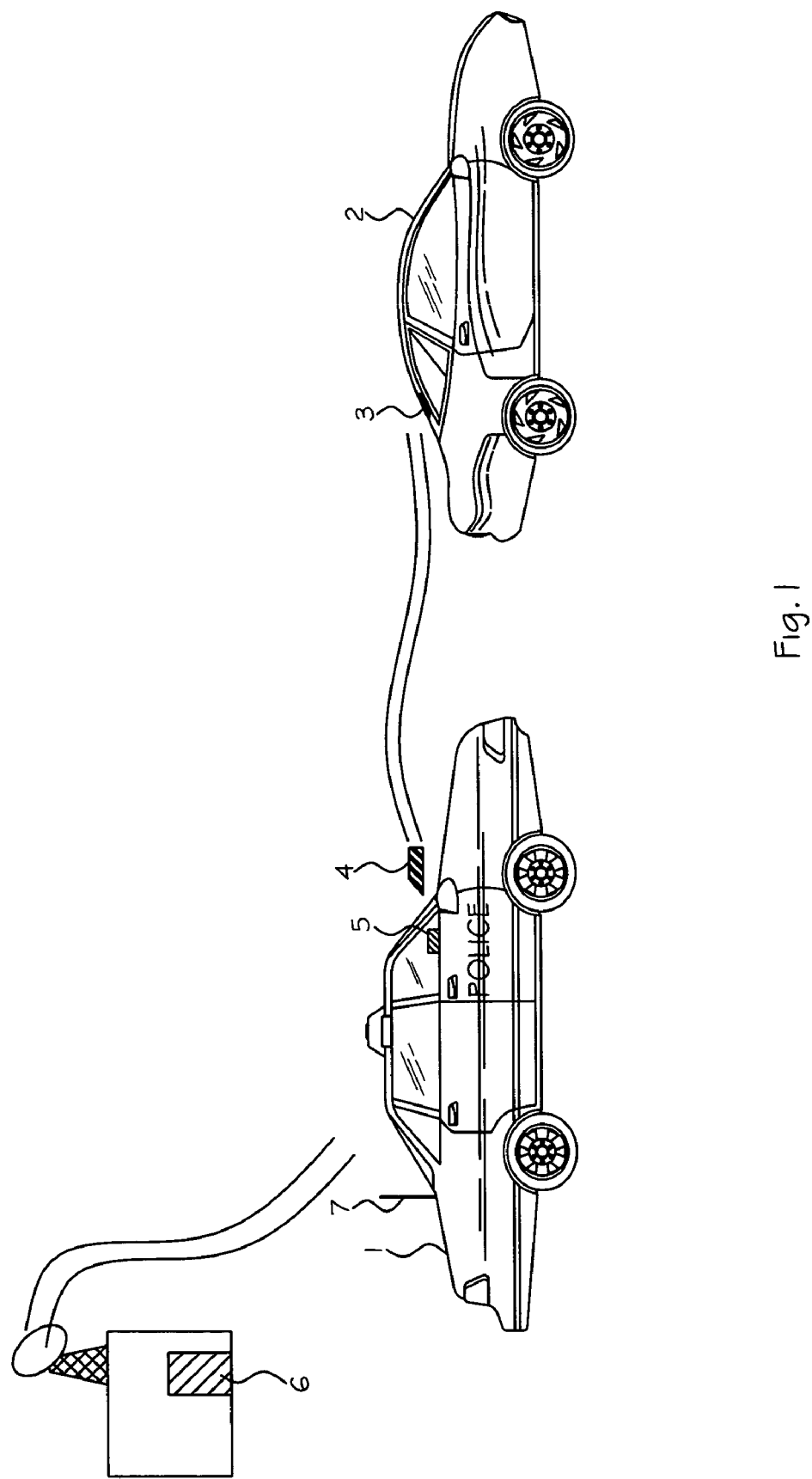

The present invention generally relates to an emergency stopping method of a stolen car without chasing at high speeds.

BACKGROUND OF THE INVENTION

Stopping a stolen car running on a highway or even on local streets is extremely dangerous, especially when the stolen car attempts to escape at high-speeds. Currently, the procedure to catch a stolen car is to compare the license plate number of a suspicious car with the stolen car list on the police computer, and then to ask the car to stop using the speakers of the police car. There are two extremely different possible reactions of the driver of the stolen car: First is to follow the request of the police, and second is to run away at high speeds. In the second case, the driver of the stolen car attempts to escape. However, as seen many times on TV news, the police never give up chasing them. This creates a very dangerous situation, and many innocent people may get hurt. It is the purpose of this invention to avoid this dangerous situation and stop the stolen car safely. The method and the means introduced by this invention will stop the stolen car immediately at the location where the police can then find the stolen car. The method and the means introduced by this invention will locate a stolen car even though the thief changes the number plate or the painting of the car.

DESCRIPTION OF THE PRIOR ARTS

U.S. Pat. No. 5,415,553 to Szmidla illustrates a device for identifying an object that includes a graphic representation of an object and an omni directional bar code representing information relative to the object. Using a bar code reader connected to a transducer that converts the bar code into humanly detectable signals, the user can scan the bar code in any direction to learn the name of the object or other information about the object.

U.S. Pat. No. 6,283,375 to Wilz, Sr., et al. illustrates a hand-held, automatically activated barcode reading mechanism with a manually activated data transmission switch. U.S. Pat. No. 6,283,370 to Watanabe, et al. illustrates a bar code reader, bar code reading method and computer readable medium.

U.S. Patent Application 20010001131 to Miller illustrates a process and apparatus for the preparation of custom blended fuels. A bar code on a fuel tank or vehicle, such as an automobile, is scanned by a bar code reader operatively associated with a fuel dispensing means to convey information about a fuel required or desired to a computer controlled customized blender associated with the fuel dispensing means. U.S. Patent Application 2002 0020742 to Streicher, et al. illustrates a fuel dispensing system wherein the fuel is provided only to authorized vehicles through verification of identification information, such as scanning a bar code disposed on the vehicle or fuel storage container.

None of the prior art illustrates a car stopping method utilizing a bar code as demonstrated in this invention.

SUMMARY OF THE INVENTION

Utilizing a bar code implanted between the inner layer and outer layer of a rear safety glass, this invention provides a safe method of stopping a stolen car without chasing at high speeds. The method is comprised of three steps 1) scanning the barcode, 2) comparing the read in bar code with the stolen car list in police computer net, 3) activating the trigger of one of three stopping means of this invention. The three stopping means are 1) turning off the engine by cutting the electricity supplied to the engine, 2) puncturing the rear tires with pistol bullets which are installed inside of rear wheel cover, and 3) puncturing the rear tires by mechanical means, which also are installed inside of the rear wheel cover. When a police identifies a stolen car, the police will activate the trigger of the stolen car by transferring the bar code of the stolen car to the trigger installed in the stolen car. Then the stolen car will stop immediately by one of the stopping means, i.e., the engine of the stolen car will stop if the stopping means is turning off the engine. If the stopping means are puncturing the rear tires, the stolen car will come to halt due to the punctured rear tires. These bar codes will allow police to identify stolen cars even if the license plate or the paint job on a car has been changed.

BRIEF DESCRITION OF THE DRAWINGS

Figure 2:
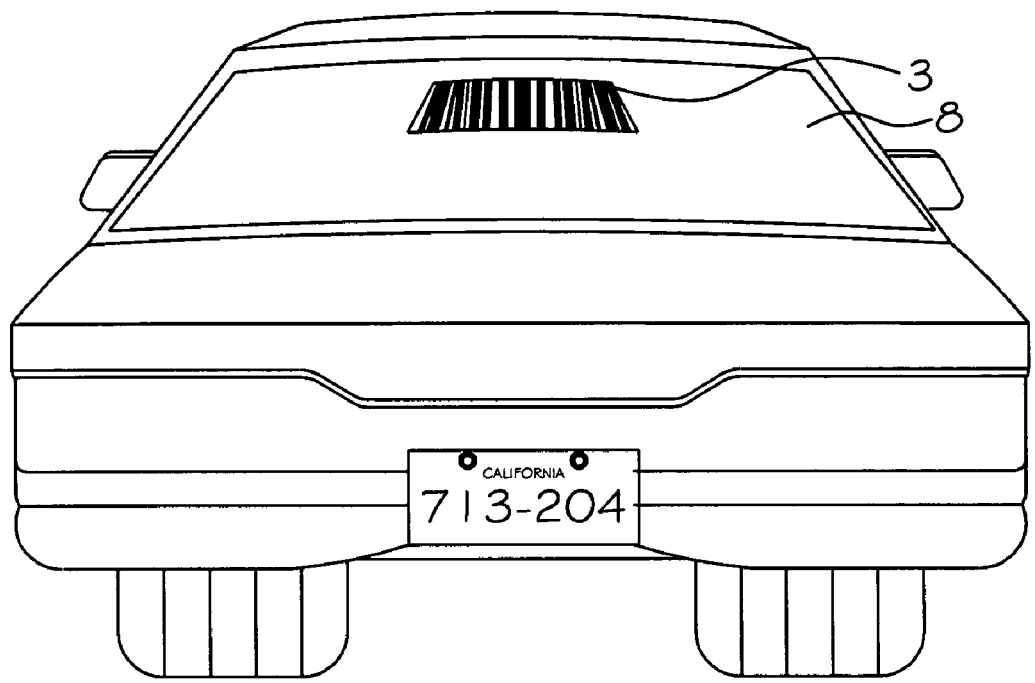
Figure 3:
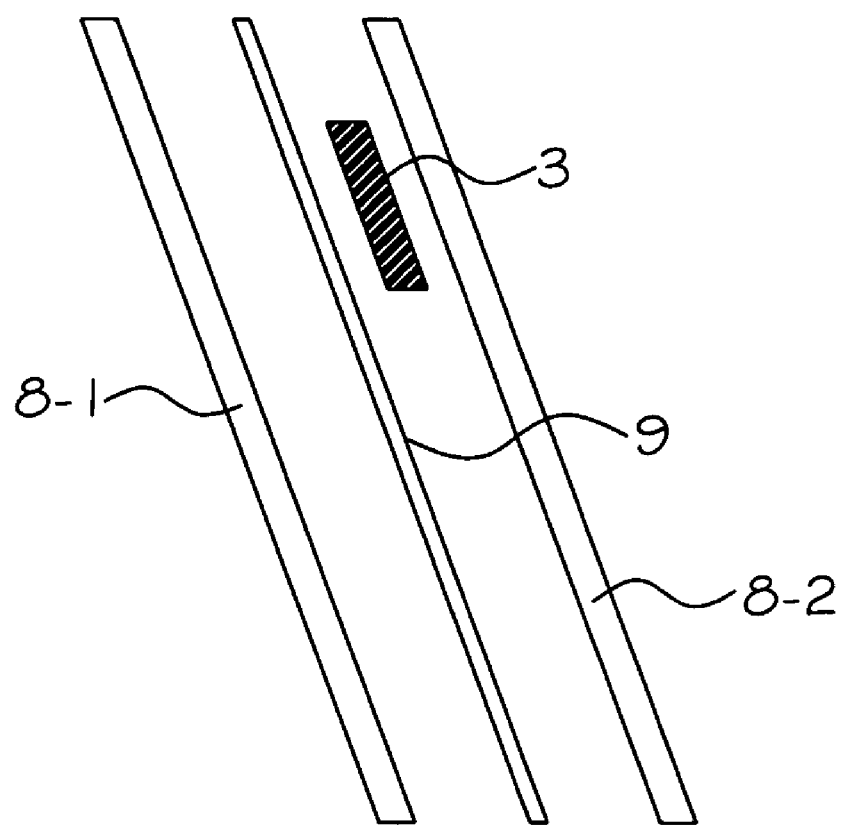
Figure 4:
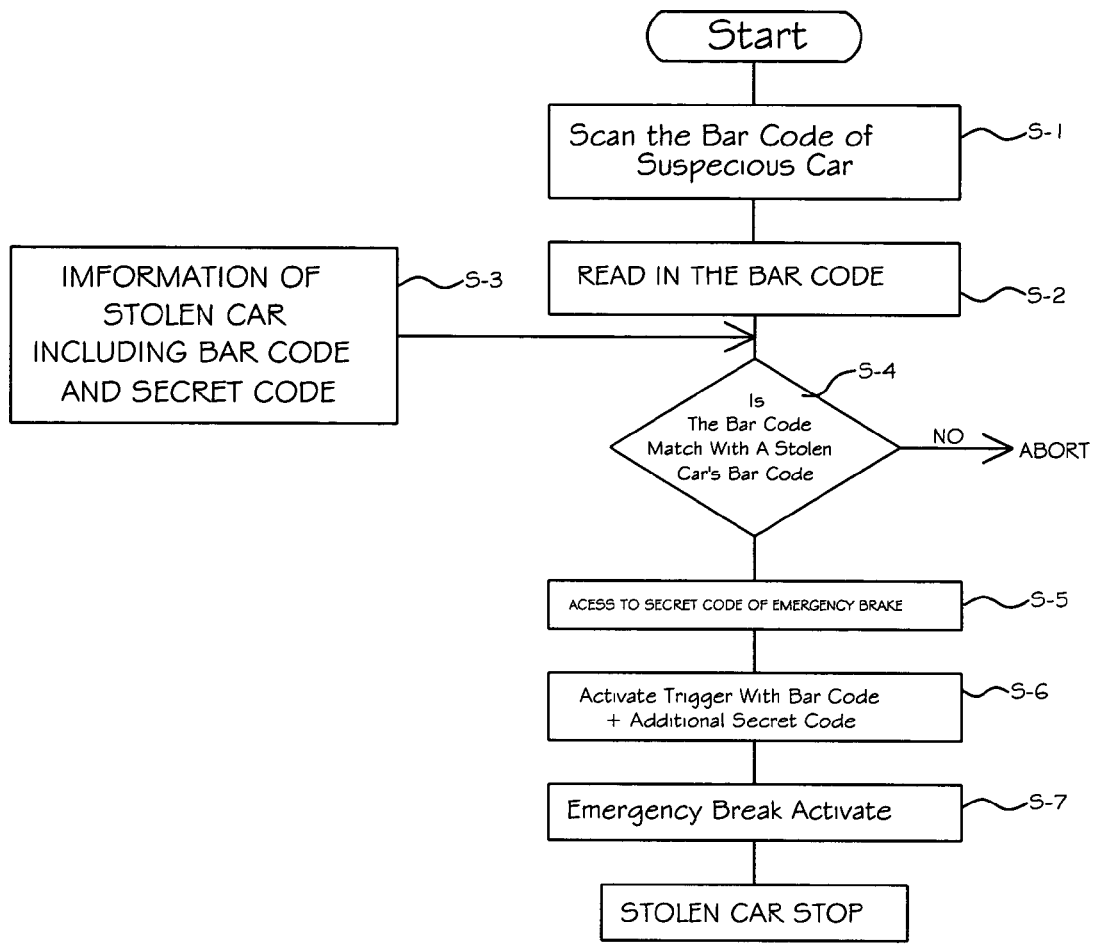
Figure 5:
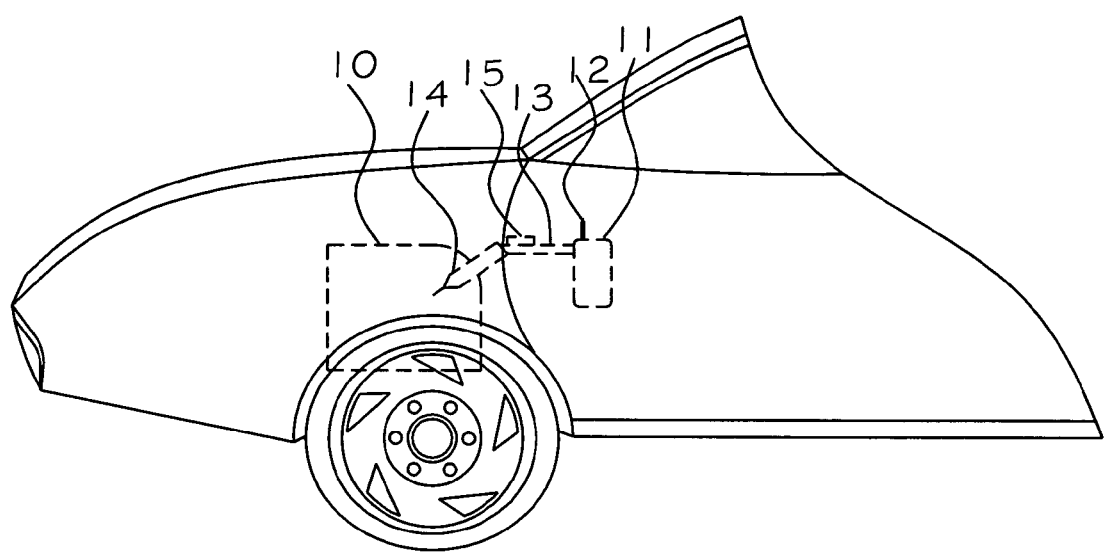
Figure 6:
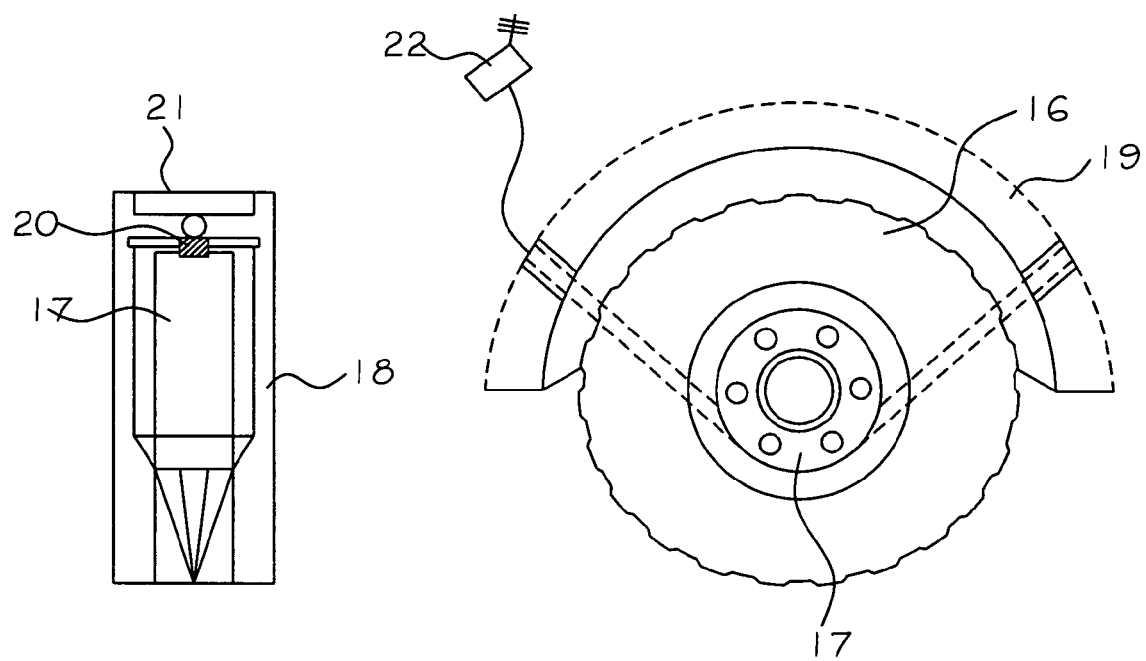
Figure 7:
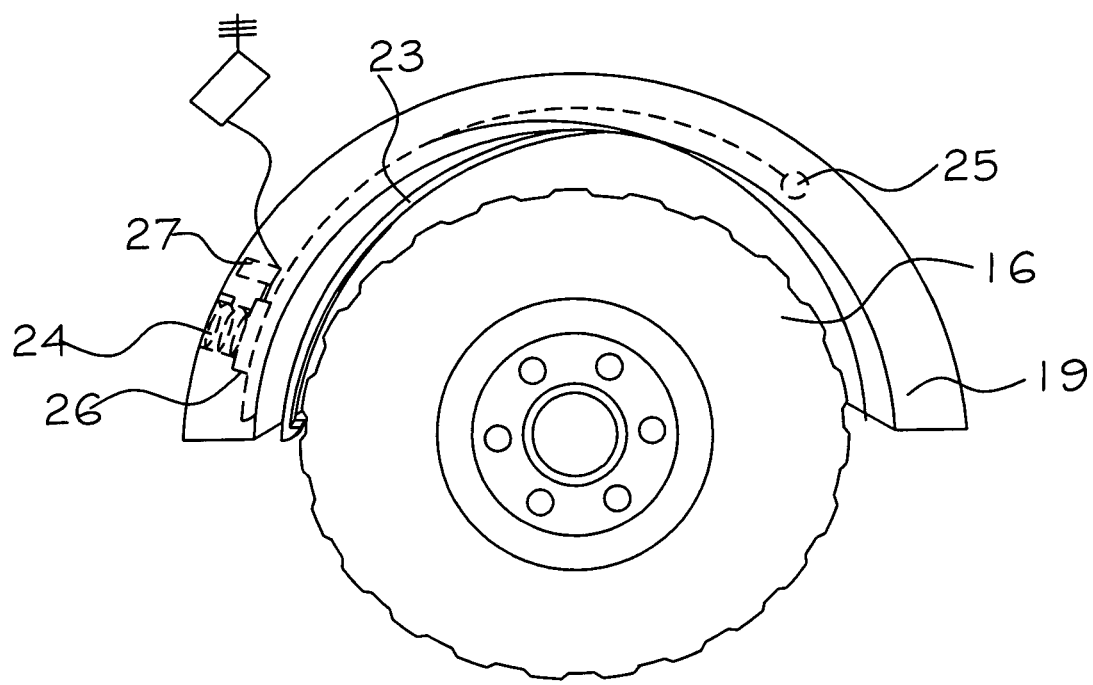

FIG. 1 is a schematic diagram of stopping a stolen car.
FIG. 2 is a perspective view of the bar code imbedded between rear safety glasses of a car.
FIG. 3 is a cross sectional view of the bar code embedded between two glasses.
FIG. 4 is a schematic flow chart of stolen car stopping method.
FIG. 5 is a schematic diagram of an emergency brake system that turns off the car's engine.
FIG. 6 is a schematic diagram of an emergency brake system that punctures rear tires with bullets.
FIG. 7 is a schematic diagram of an emergency brake system that punctures rear tires with hook blades.

DETAILED DERCRIPTION OF THE PREFERRED EMBODIMENT

FIG. 1 is a schematic diagram of stopping a stolen car. When a police car (1) on patrol finds a suspicious car (2), the police officer in the car (not shown in the figure) starts scanning the bar code (3) of the suspicious car (2) with portable bar code scanner (4) which is connected to a police mobile computer (5) installed in the police car (1). The mobile computer (5) is connected to the main police host computer (6) by wireless radio (7). The bar code (3) used for the above purpose is installed on the rear safety glass (8) as shown in FIG. 2. FIG. 3 is a cross sectional view of the bar code (3) embedded between two glasses. To avoid damage and change, the bar code (3) is inserted between inner- and outer layer glasses (8-1 and 8-2) and outer side of the safety film (9), which is made of transparent adhesive elastic polymer.

FIG. 4 is a schematic logic diagram of stolen car stopping method. When a police officer scans the bar code (3) on a suspicious car (2) in step S-1, the code on the suspicious car (2) is read in by the same scanner (4) in step S-2. The read of the bar code information is transferred to the mobile computer (5) installed in the police car (1). At the same time, the police officer requests the updated list of stolen cars and their information, including the bar codes, to the host computer (6) of police department in step S-3.

In step S-4, the bar code (3) of the suspicious car (2) is compared with the bar codes of stolen cars. If there is no matched bar code, the procedure is aborted. If there is a bar code match with the bar code (3) of the suspicious car (2), go to step S-5.

In step S-5, a secret code for the emergency brake, which is provided from the original owner and manufacturer, is opened to the police officer when the bar code (3) of the suspicious car matches with one of the stolen cars.

In step S-6, the police officer sends a signal activating the emergency brake to the central process computer or electric trigger of the suspicious car with the bar code (3) information and an additional secret code for emergency brake.

In step S-7, the emergency brake system of the car is activated and the suspicious car (2) stops.

Three emergency brake systems are illustrated as follows:

The first type is to disconnect electricity supplying power to the ignition plug of the car. FIG. 5 is a schematic diagram of emergency brake system that turns off the car's engine (10). For this purpose, the main computer (11) of the car has a wireless data input means (12) for receiving the bar code (3) and the secret code, and has a program to disconnect the power supply (13) to the ignition plug (14) activated by the bar code and the secret code. The other way is to install a power disconnector (15), which is activated by the bar code and secret code, in the middle of the power line to the ignition plug.

The second type of emergency brake system is to puncture both of the rear tires with pistol bullets. FIG. 6 is a schematic diagram of emergency brake system of puncturing rear tires (16) with bullets (17). Two sets of one bullet (17) in a short barrel (18) are installed at the inside of one rear wheel cover (19). Another two sets of bullet (17) in a short barrel (18) are installed at the inside of rear wheel cover of opposite site. The percussion (20) of the bullet (17) is connected to an electric trigger line (21). The electric trigger line is connected to the main computer (11) of FIG. 5. or another wireless trigger (22) responding to the bar code (3) information with another secret code.

The third type of emergency brake system is to puncture both of the rear tires with jack knives. FIG. 7 is a schematic diagram of emergency brake system of puncturing rear tires (16) with hook blades (23). One hook blade (23) connected to a spring (24) is installed at the inside of rear wheel cover. Another set of hook blades (23) connected to a spring (24) is installed at the inside of another rear wheel cover of opposite side. One end of the hook blade (23) is pivotally fixed to the rear wheel cover (19) with bolt and nut (25). The other side of the hook blade (23) is captured by a trigger (26), which is connected to an electric trigger line (27). The electric trigger line is connected to the main computer (11) of FIG. 5 or another wireless trigger (21) responding to the bar code (3) information with another secret code.

What is claimed is:

1. A stopping method of a stolen car, without high speed chasing, comprised of three steps of: 1) scanning the barcode of a suspicious car, which is implanted between the inner- and outer-layer glasses of a rear safety glass, 2) comparing the read in bar code with the stolen car list in the police computer net, 3) activating the trigger by transferring the bar code and the secret code of the stolen car to the trigger installed in the stolen car to shut down the engine by cutting off the electricity supplied to it.

2. A stopping method of a stolen car comprised of three steps of: 1) scanning the barcode of a suspicious car, which is implanted between the inner- and outer-layer glasses of a rear safety glass, 2) comparing the read in bar code with the stolen car list in the police computer net, 3) activating the trigger, by transferring the bar code and the secret code of the stolen car to the trigger installed in the stolen car to puncture the rear tires with four sets of one pistol bullet engaged in a short barrel which are installed inside of both of the rear wheel covers.

3. A stopping method of a stolen car comprised of three steps of: 1) scanning the barcode of a suspicious car, which is implanted between the inner- and outer-layer glasses of a rear safety glass, 2) comparing the read in bar code with the stolen car list in the police computer net, 3) activating the trigger by transferring the bar code and the secret code of the stolen car to the trigger installed in the stolen car to puncture the rear tires with two anchor knives which are installed inside of both of the rear wheel covers.

* * * * *